United States Patent

Husby et al.

[11] Patent Number: 6,081,759
[45] Date of Patent: Jun. 27, 2000

[54] SEAT BELT TENSION SENSOR

[75] Inventors: Harald Snorre Husby, Lakeland; Leonard Simpson, Margate, both of Fla.

[73] Assignee: Breed Automotive Technology, Inc., Lakeland, Fla.

[21] Appl. No.: 09/065,497

[22] Filed: Apr. 24, 1998

[51] Int. Cl.[7] .................................................. B60R 22/00
[52] U.S. Cl. .................... 701/45; 280/801.1; 324/207.21
[58] Field of Search .......................... 701/45; 280/801.1, 280/804, 806, 808; 324/200, 207.13, 207.21; 24/303, 371, 642

[56] References Cited

U.S. PATENT DOCUMENTS

| | | | |
|---|---|---|---|
| 4,943,087 | 7/1990 | Sasaki | 280/804 |
| 5,060,977 | 10/1991 | Saito | 280/802 |
| 5,309,135 | 5/1994 | Langford | 338/211 |
| 5,454,591 | 10/1995 | Mazur et al. | 280/735 |
| 5,494,311 | 2/1996 | Blackburn et al. | 280/735 |
| 5,570,903 | 11/1996 | Meister et al. | 280/735 |
| 5,583,476 | 12/1996 | Langford | 338/211 |
| 5,605,348 | 2/1997 | Blackburn et al. | 280/735 |
| 5,618,056 | 4/1997 | Schoos et al. | 280/735 |
| 5,636,864 | 6/1997 | Hori | 280/735 |

OTHER PUBLICATIONS

Magnetic Field Sensors for Magnetic Position Sensing in Automotive Applications; GM R & D—8651; Joseph P. Heremans, Physics & Physical Chemistry Dept.

*Primary Examiner*—Tan Nguyen
*Attorney, Agent, or Firm*—Lonnie R. Drayer; Patrick Stiennon

[57] ABSTRACT

A sensor of Giant magneto-resistive (GMR) type is attached to a seat belt anchor bracket. A seat belt passes through an opening in the bracket and is doubled back and sewn to form a loop. A magnet positioned on a sliding carriage is biased away from the sensor by springs. A seat belt loops around the carriage, and when tension is applied to the belt, the carriage with the magnet is drawn against the springs toward the GMR sensor. The GMR sensor measures the magnetic field present at the sensor and a microprocessor determines belt tension based on the known spring constants and the strength of measured magnetic field which is correlated with displacement of the magnet.

15 Claims, 2 Drawing Sheets

SEAT BELT TENSION SENSOR

FIELD OF THE INVENTION

The present invention relates to sensors used to determine when and how an airbag should be deployed in general and to sensors for monitoring tension applied to a seat belt in particular.

BACKGROUND OF THE INVENTION

Airbags were developed to protect occupants of cars during vehicle crashes. Originally airbags were viewed as an alternative to seat belts, because they are passive devices which do not require the cooperation of the vehicle's occupants to be effective. However, experience has shown that airbags should be considered an adjunct to seat belts. When used properly, airbags can in certain crash situations reduce injuries to occupants. An airbag is a gas-filled bag which is rapidly deployed in the event of a vehicle crash. When appropriate automotive sensors determine that a crash situation has occurred, the airbag is rapidly inflated to create an impact cushion between the occupant(s) of a vehicle and the structure of the vehicle. Consideration is also being given to the design of airbags which better position the vehicle occupant to withstand crash-induced accelerations.

An airbag system is made up of two basic functional components: an airbag mocule, including the means for deploying the airbag; and the sensors and circuitry which determine whether the airbag should be deployed.

Recently sensors have been developed to determine the weight imposed on the front seat, and the value of the determined weight may then be used as an input into the system logic which determines whether or not an airbag should be deployed or whether the mode of deployment should be modified in airbag systems which are capable of varying the deployment sequence to accommodate varying circumstances. In some cases, however, these weight sensors can be confused by loads imposed by the compression of the seat resulting from installing a child's car seat and tensioning the seat belt to hold the child seat into place.

One proposed solution is to place a device on each child seat which can be detected by a sensor and thus used to determine the presence of a child seat. However, this approach relies on gaining cooperation of all manufacturers of child car seats and would take many years before all old child car seats have been replaced with child car seats containing the needed sensor.

What is needed is a sensor which can provide data for determining whether a child's seat is positioned in the front passenger seat of an automobile.

SUMMARY OF THE INVENTION

The sensor of this invention measures seat belt tension. Seat belt tension is by itself indicative of the presence of a child car seat because proper installation of a car seat involves tightening the car seat belt as tight as possible to snugly hold the car seat in place. Thus a passenger will be uncomfortable with much less seat belt tension than a child seat will normally be installed with. When used in combination with a seat occupant weight sensor the belt tension sensor allows direct determination of the actual weight of the seat occupant corrected for any loads imposed by a tensioned seat belt. In this way the weight of the seat occupant can be used with greater confidence to decide when and how an airbag should be deployed.

The seat belt tension sensor of this invention employs a magneto-resistive sensor of the Giant Magneto-Resistive (GMR) type. The sensor is attached to a seat belt anchor bracket. A seat belt passes through an opening in the anchor and is doubled back and sewn to form a loop. A magnet positioned on a sliding carriage is biased away from the sensor by springs. The belt loops around the carriage, and tension on the belt causes the carriage with the magnet to be drawn against the springs toward the GMR sensor. The GMR sensor measures the magnetic field present at the sensor and a microprocessor determines belt tension based on the known spring constants and the strength of the measured magnetic field which is a function of displacement of the magnet. Thus the sensed magnetic field is directly proportional to carriage displacement, carriage displacement is proportional to spring compression force based on a spring constant, and belt tension is equal to the determined compression force of the springs.

It is a feature of the present invention to provide a seat belt tension sensor which is mechanically simple.

It is a further feature of the present invention to provide an airbag deployment system which incorporates seat belt tension as one factor used by the system deployment logic.

It is another feature of the present invention to provide a seat belt tension sensor wherein the sensor element does not move.

Further objects, features and advantages of the invention will be apparent from the following detailed description when taken in conjunction with the accompanying drawings.

DETAILED DESCRIPTION OF THE INVENTION

Figure 1:
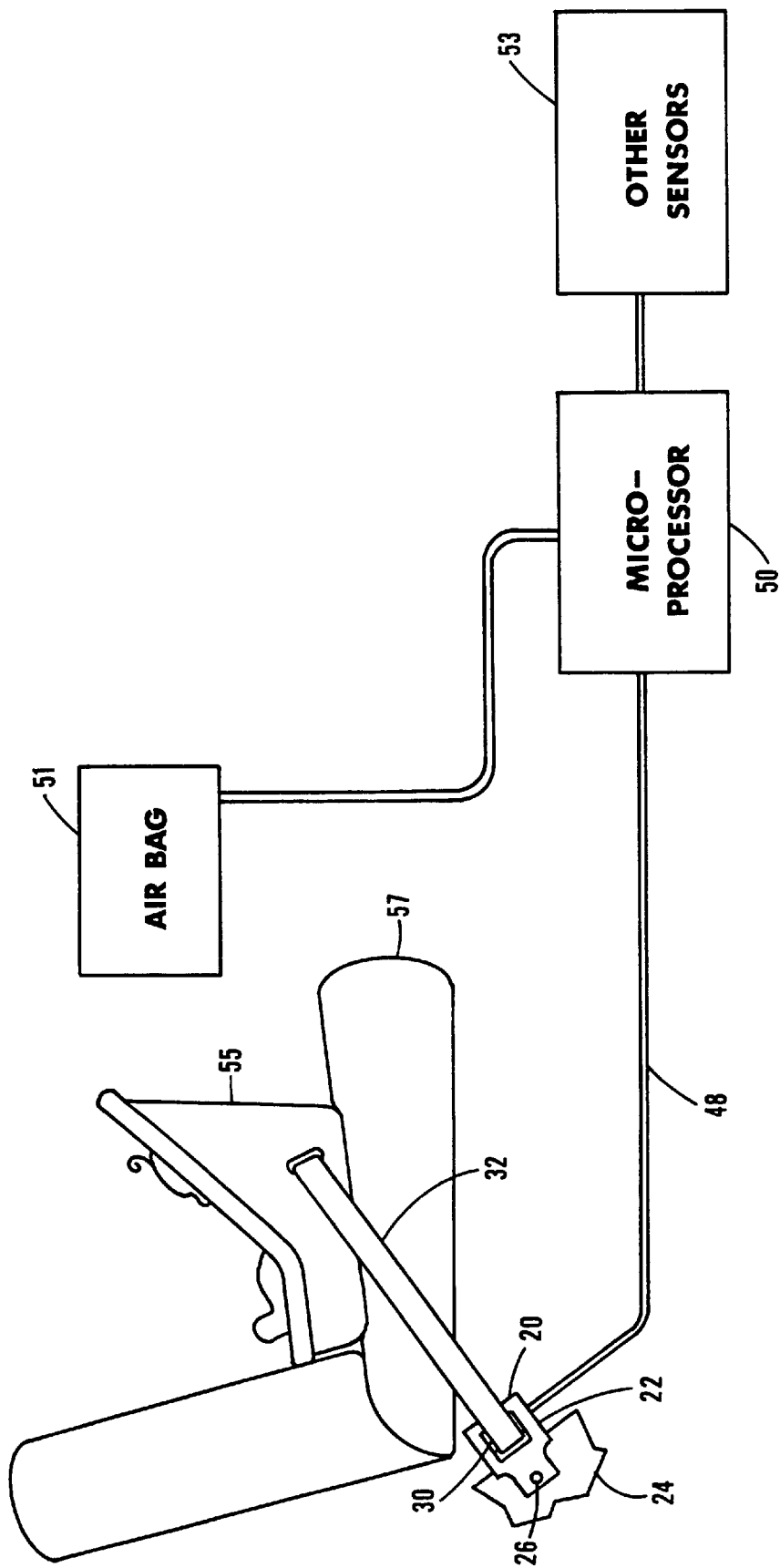
FIG. 1 is an schematic representation of a child car seat installed in a vehicle together with the seat belt tension sensor of this invention and a schematic of the airbag and airbag deployment system.
Figure 3:
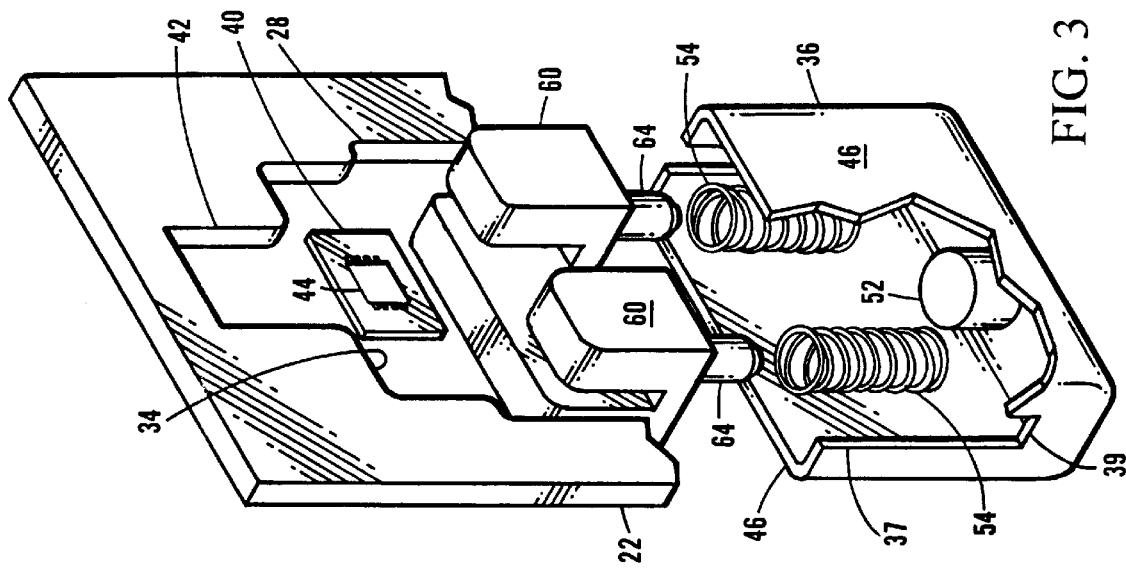
FIG. 3 is an exploded isometric view, partially broken away in section, of the seat belt tension sensor of FIG. 1.
Figure 2:
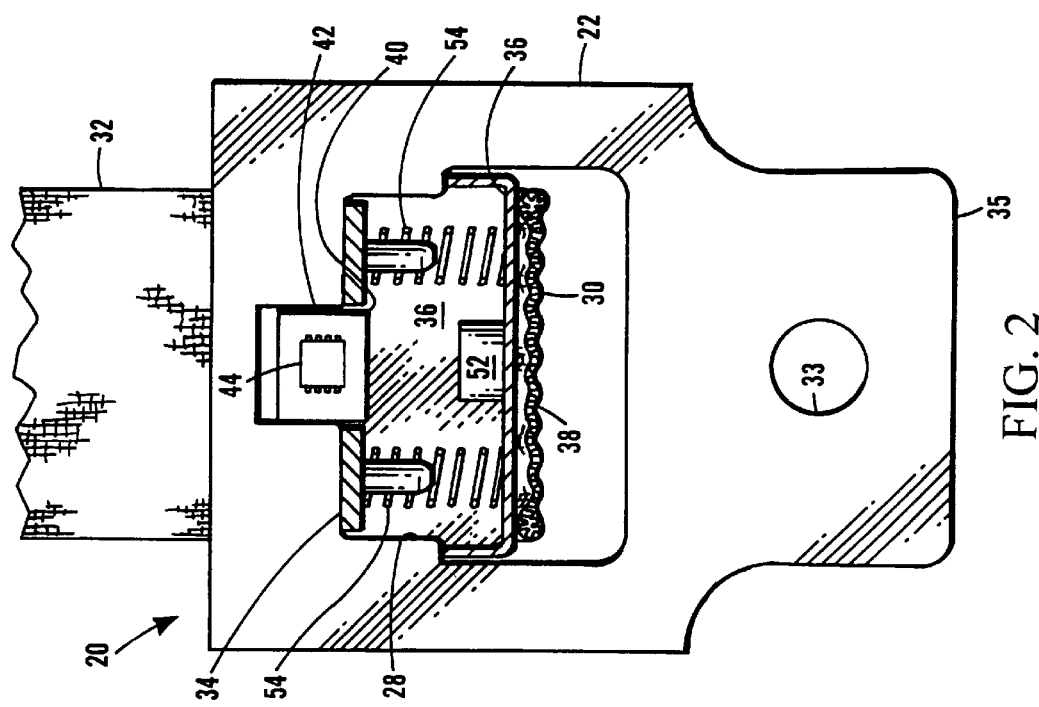
FIG. 2 is a front elevational view, partially broken away in cross-section, of the seat belt tension sensor of FIG. 1.

Referring to FIGS. 1–3 wherein like numbers refer to similar parts, a seat belt tension sensor 20 is fixed to a seat belt anchor bracket 22. As best shown in FIG. 1, the anchor bracket 22 is mounted to a structural component 24 of a vehicle by a bolt 26. The anchor bracket 22, as shown in FIG. 2, has an opening 28 through which a loop 30 of a seat belt 32 passes. A hole 33 is formed in the lower portion 35 of the anchor bracket 22 through which the bolt 26 passes.

The seat belt loop 30 connects the seat belt 32 to the anchor bracket 22. When tension is applied to the seat belt 32 the loop 30 is pulled toward the top side 34, or seat belt restraining side, of the opening 28 in the anchor bracket 22. As shown in FIGS. 2 and 3, a sliding carriage 36 is positioned between the bottom 38 of the belt loop 30 and the top side 34 of the opening 28. The carriage 36 sides 46 have inwardly-turned edges 37 which guide the motion of the carriage 36 along the bracket 22. Reduced height end wall stops 39 are formed between the edges 37. The stops 39 serve to limit travel of the carriage 36. A circuit board 40 is mounted in a rectangular notch 42 in the top side 34 of the bracket 22. The circuit board 40 contains an integrated circuit chip 44 which incorporates a GMR sensor.

As shown in FIG. 1, the sensor within the chip 44 is connected by wire leads 48 to a microprocessor 50. The microprocessor 50 is connected to an airbag 51 and other sensors 53. The airbag 51 is positioned with respect to a particular passenger seat 57 on which a passenger or a child car seat 55 is restrained by the seat belt 32. The decision to deploy an airbag is made by the microprocessor 50. The deployment decision is based on logic which considers the acceleration of a crash as detected by one or more crash sensors. Other criteria can include crash severity and data indicative of whether the front seat is occupied by a passenger who would benefit from the deployment of the airbag 51. Sensors which determine the weight of the occupant, the size of the occupant and the location of the seat have been developed. The seat belt tension sensor 20 supplies an important piece of information which can be considered by the microprocessor logic alone or with other data to reach a conclusion about the desirability of employing an airbag in a particular situation.

As shown in FIG. 3, the GMR sensor in the chip 44 responds to a magnet 52 which is affixed to the bottom of the U-shaped sliding carriage 36. When tension is applied to the seat belt 32 it draws the carriage 36 against springs 54 toward the top side 34 of the opening 28 where the GMR sensor on the chip 44 is mounted. The GMR sensor responds to the intensity of the magnetic field which reaches the sensor on the chip 44. The sensor has a response which varies as belt tension draws the carriage 36 and the magnet 52 toward the GMR sensor on the chip 44. The magnetic field present at the sensor is thus correlated with belt tension by the microprocessor 50.

The GMR sensors utilize an effect discovered in 1988, in which certain thin film devices are able to detect static magnetic fields. GMR sensors utilize resistors built up of thin magnetic film a few nanometers thick separated by equally thin nonmagnetic layers.

A decrease in resistance of between about 10 and 20 percent in the built-up resistors is observed when a magnetic field is applied. The physical explanation for the decrease in resistance is the spin dependence of electron scattering and the spin polarization of conduction electrons in ferromagnetic metals.

The extremely thin adjacent magnetic layers couple antiferromagnetically to each other so that the magnetic moments of each magnetic layer are aligned antiparallel to adjacent magnetic layers. Electrons, spin polarized in one magnetic layer, are likely to be scattered as they move between adjacent layers. Frequent scattering results in high resistance. An external magnetic field overcomes the antiferromagnetic coupling and produces parallel alignment of moments in adjacent ferromagnetic layers. This decreases scattering and thus device resistance.

In an exemplary sensor a group of four resistors based on the GMR technology are arranged in a Wheatstone bridge and two legs of the bridge are shielded from the applied magnetic fields. The other two legs are positioned between the magnetic shields. The magnetic shields act as flux concentrators to produce a device of tailored sensitivity to a magnetic flux of a selected intensity. A regulated voltage or current is supplied to the resistor network and the variation in current or voltage is measured and correlated with magnetic field strength.

As an alternative the resistance of one or more GMR resistors may be measured directly by an ohmmeter incorporated in the microprocessor. The sensor can be designed to have an axis of sensitivity which is produced by the orientation of the magnetic flux shields within the chip 44. The axis of sensitivity in the sensor is aligned with the direction of motion of the carriage 36.

GMR sensors are available from Nonvolatile Electronics Inc. of 11409 Valley View Rd., Eden Prairie, Minn. (www.nve.com). GMR sensors are small, highly sensitive devices which have exceptional temperature stability, deliver high signal levels and require very little power and cost less than many competitive devices. All these factors are important in devices used in automobile safety applications.

The carriage 36 not only supports tension loads when the seat belt 32 is tightened but also supports any crash-induced loads. Because crash loads are very large, spring guides 60 are constructed of metal, preferably high strength steel. The spring guides 60 may be riveted or force fit onto the anchor bracket 22. The spring guides 60 have guide posts 64 about which the coil springs 54 are positioned. The posts 64 bottom out against the carriage 36 at a belt tension of about eighty-nine Newtons (twenty pounds). A tension in this range is sufficient to differentiate between a car seat or other object and a person. The carriage 36 is constructed of high strength steel both to absorb the loads in a crash and so that the sides 46 of the carriage 36 shield the GMR sensor from stray magnetic fields.

It should be understood that the springs can be of various designs including Belleville Springs, gas springs, and springs using other shapes and configurations.

It should be understood that although a sensor based on GMR technology is described, other types of magnetic field sensors such as Hall sensors and other solid state sensors as exist or may be developed could be used. In addition a simple reed switch could provide binary or stepped information concerning displacement of a magnet.

It should also be understood that although a GMR sensor can be used with a reference voltage or current, the change in resistance of one or more GMR resistors can be determined directly with a circuit which functions as an ohmmeter.

If the GMR sensor is used with voltage or current where the GMR sensor is an active part of a Wheatstone bridge, four wires are normally required. If the GMR sensor is used simply as a simple resistor, two wires are sufficient.

It should also be understood that other types of magnetic field sensors could be employed to detect the motion of the carriage 36 toward the sensor.

It is understood that the invention is not limited to the particular construction and arrangement of parts herein illustrated and described, but embraces such modified forms thereof as come within the scope of the following claims.

What is claimed is:

1. A seat belt tension sensor comprising:
   a bracket adapted to be attached to a structural number of a passenger vehicle, the bracket having portions defining an opening through which a seat belt is looped, wherein the bracket has a seat belt restraining side;
   a carriage positioned within the bracket opening and movable toward the restraining side;
   a magnetic field sensor mounted on the restraining side of the bracket;
   a magnet mounted on the carriage for motion toward the sensor mounted on the restraining side; and
   at least one spring positioned between the carriage and the restraining side, biasing the carriage away from the restraining side, wherein the carriage moves toward the restraining side when tension is applied to the seat belt.

2. The seat belt tension sensor of claim 1 wherein the magnetic field sensor is of the type producing a continuously changing state as an applied magnetic field varies.

3. The seat belt tension sensor of claim 1 wherein the sensor is of the GMR type.

4. The seat belt tension sensor of claim 1 wherein the magnet is positioned opposite the sensor and further comprising:
   a pair of spring guides positioned on either side of the magnet, and
   springs mounted on the guides, the guides extending from the bracket toward the carriage, the guides positioned to limit the movement of the carriage toward the restraining side.

5. The seat belt tension sensor of claim 1 wherein the carriage is U-shaped having a U bottom on which the magnet is mounted and upstanding sides which shield the magnet and the sensor from magnetic fields other than the field produced by the magnet.

6. A seat belt tension sensor comprising:
   a bracket adapted to be held fixed relative to a structural member on a passenger vehicle;
   a belt retaining portion of the bracket;
   a magnetic field sensor mounted on the bracket;
   a carriage mounted on the bracket for movement toward and away from the sensor;
   a means for biasing the carriage away from the bracket; and
   a magnet mounted on the carriage so that motion of the carriage against the means for biasing moves the magnet toward the sensor.

7. The seat belt tension sensor of claim 6 wherein the magnetic field sensor is of the type producing a continuously changing state as an applied magnetic field varies.

8. The seat belt tension sensor of claim 6 wherein the sensor is of the GMR type.

9. The seat belt tension sensor of claim 6 wherein the magnet is positioned opposite the sensor and further comprising a pair of guides positioned on either side of the magnet, and wherein the means for biasing includes springs mounted on the guides, the guides extending from the bracket toward the carriage, the guides positioned to limit the movement of the carriage toward the retaining portion of the bracket.

10. The seat belt tension sensor of claim 6 wherein the carriage is U-shaped having a U bottom on which the magnet is mounted and upstanding sides which shield the magnet and the sensor from magnetic fields other than the field produced by the magnet.

11. A seat belt tension indicating apparatus comprising:
    a means for detecting and transmitting information about magnetic field strength;
    a magnet;
    a means for positioning the magnet spaced from the sensor;
    a means for biasing the magnet away from the sensor; and
    a means for attaching a seat belt to a passenger vehicle so that tension on the seat belt moves the magnet and sensor closer together.

12. The seat belt tension sensor of claim 11 wherein the means for detecting and transmitting information about magnetic field strength is of the type producing a continuously changing state as an applied magnetic field varies.

13. The seat belt tension sensor of claim 11 wherein the means for detecting and transmitting information about magnetic field strength is of the GMR type.

14. The seat belt tension sensor of claim 11 wherein the magnet is positioned opposite the sensor and further comprising a pair of guides positioned on either side of the magnet, and wherein the means for biasing includes springs mounted on the guides, the guides extending from the means for detecting and transmitting information about magnetic field strength toward the means for positioning the magnet spaced from the sensor, the guides positioned to limit the movement of the carriage toward the restraining side.

15. The seat belt tension sensor of claim 11 wherein the means for positioning the magnet spaced from the sensor is a carriage having a U-shape and having a U bottom on which the magnet is mounted and upstanding sides which shield the magnet and the means for detecting and transmitting information about magnetic field strength from magnetic fields other than the field produced by the magnet.

* * * * *